United States Patent
Mäkinen et al.

(10) Patent No.: US 11,580,966 B2
(45) Date of Patent: Feb. 14, 2023

(54) PRE-PROCESSING FOR AUTOMATIC SPEECH RECOGNITION

(71) Applicant: NOKIA TECHNOLOGIES OY, Espoo (FI)

(72) Inventors: Jorma Mäkinen, Tampere (FI); Matti Hämäläinen, Lempäälä (FI); Hannu Pulakka, Pirkkala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 189 days.

(21) Appl. No.: 16/912,141

(22) Filed: Jun. 25, 2020

(65) Prior Publication Data
US 2020/0410993 A1    Dec. 31, 2020

(30) Foreign Application Priority Data
Jun. 28, 2019 (GB) .................................... 1909353

(51) Int. Cl.
| G10L 15/20 | (2006.01) |
| G10L 21/0232 | (2013.01) |
| G10L 25/06 | (2013.01) |
| G10L 25/18 | (2013.01) |
| H04R 1/40 | (2006.01) |

(52) U.S. Cl.
CPC .......... *G10L 15/20* (2013.01); *G10L 21/0232* (2013.01); *G10L 25/06* (2013.01); *G10L 25/18* (2013.01); *H04R 1/406* (2013.01)

(58) Field of Classification Search
CPC ..... G10L 15/20; G10L 21/0232; G10L 25/06; G10L 25/18; G10L 21/0216; G10L 25/84; G10L 21/02; G10L 21/0208; G10L 2021/02165; H04R 1/406
See application file for complete search history.

(56) References Cited

U.S. PATENT DOCUMENTS

| 6,549,630 | B1 * | 4/2003 | Bobisuthi | ................ H03G 3/32 |
| | | | | 381/106 |
| 9,100,756 | B2 * | 8/2015 | Dusan | ..................... H04R 29/00 |
| 9,467,779 | B2 * | 10/2016 | Iyengar | ..................... H04R 1/08 |
| 10,079,026 | B1 * | 9/2018 | Ebenezer | ............. G10K 11/175 |
| 10,192,566 | B1 * | 1/2019 | Bullough | ................ H04R 3/005 |

(Continued)

FOREIGN PATENT DOCUMENTS

| EP | 1 669 983 A1 | 6/2006 |
| EP | 2 871 824 A1 | 5/2015 |

(Continued)

OTHER PUBLICATIONS

Extended European Search Report from corresponding European Patent Application No. 20180526.4, dated Nov. 27, 2020, 8 pages.

(Continued)

*Primary Examiner* — Akwasi M Sarpong
(74) *Attorney, Agent, or Firm* — Alston & Bird LLP

(57) ABSTRACT

A method is provided that includes obtaining two or more microphone audio signals; analysing the two or more microphone audio signals for a defined noise type; and processing the two or more microphone audio signals based on the analysis to generate at least one audio signal suitable for automatic speech recognition. A corresponding apparatus is also provided.

18 Claims, 8 Drawing Sheets

(56) References Cited

U.S. PATENT DOCUMENTS

| | | | | |
|---|---|---|---|---|
| 2003/0147538 | A1* | 8/2003 | Elko | H04R 3/005 |
| | | | | 381/91 |
| 2005/0047611 | A1* | 3/2005 | Mao | H04R 3/005 |
| | | | | 381/92 |
| 2009/0164212 | A1* | 6/2009 | Chan | G10L 21/0208 |
| | | | | 704/226 |
| 2009/0238377 | A1* | 9/2009 | Ramakrishnan | H04R 3/005 |
| | | | | 381/92 |
| 2010/0130198 | A1* | 5/2010 | Kannappan | H04M 1/6066 |
| | | | | 455/434 |
| 2010/0278352 | A1* | 11/2010 | Petit | H04R 1/1083 |
| | | | | 381/71.1 |
| 2015/0312691 | A1* | 10/2015 | Virolainen | H04R 29/005 |
| | | | | 381/58 |
| 2016/0205467 | A1* | 7/2016 | Elko | G10L 21/0264 |
| | | | | 381/92 |
| 2018/0330747 | A1* | 11/2018 | Ebenezer | G10L 15/20 |

FOREIGN PATENT DOCUMENTS

| | | |
|---|---|---|
| GB | 2580057 | 7/2020 |
| WO | WO 2011/137258 A1 | 11/2011 |

OTHER PUBLICATIONS

Grimm, S. et al., *Wind Noise Reduction for a Closely Spaced Microphone Array in a Car Environment*, EURASIP Journal on Audio, Speech, and Music Processing, No. 7 (2018) 9 pages.

Wolf, M., *Channel Selection and Reverberation-Robust Automatic Speech Recognition*, Phd Thesis, Universitat Politechnica (Oct. 2013) 119 pages.

Great Britain Application No. 1902812.5 filed Mar. 1, 2019, In re: Vilkamo et al., entitled *Wind Noise Reduction in Parametric Audio*.

\* cited by examiner

PRE-PROCESSING FOR AUTOMATIC SPEECH RECOGNITION

CROSS-REFERENCE TO RELATED APPLICATIONS

This application claims priority to Great Britain Application No. 1909353.3, filed Jun. 28, 2019, the entire contents of which are incorporated herein by reference.

FIELD

The present application relates to apparatus and methods for pre-processing for automatic speech recognition, but not exclusively for pre-processing for automatic speech recognition for a mobile device.

BACKGROUND

Virtual assistants like Cortana, Siri, Alexa and Google Assistant have become important features of mobile devices. The latest devices make it possible to use, for example, information services practically everywhere. The voice interface allows the use of services in hands free use cases such as when operating machinery. Voice interaction is also an important technical enabler for natural language understanding which has several commercial applications and is one of the most prominent trends of AI technologies in the mobile industry.

Mobile phones are used for accessing digital services in a wide range of different acoustic environments and environmental conditions. This raises a requirement that good automatic speech recognition performance is expected in conditions which range from the ideal to unfavourable. Voice recognition systems are vulnerable to errors and because misinterpretation of individual words can completely change the meaning of the sentence if a Word Error Rate (WER) increases (for example in less optimal environmental conditions) the services can be unreliable causing the user to reject them.

Audio signal processing includes a wide range of signal processing methods aiming to improve the signal-to-noise ratio (SNR) of captured audio (for example captured from microphones). These methods are typically designed for human listener so that the perceived audio quality or intelligibility of the recorded speech is improved compared to unprocessed signals. In automatic speech recognition (ASR) application the goal is to enhance the recorded audio in such a way that the ASR engine can perform accurate speech to text transcription e.g. for an input to a search engine.

In general, ASR engines and human listeners have quite similar requirements and high-quality signal is favourable for both human as well as machine listening. However optimization of ASR performance reveals differences where certain types of nonlinear signal distortions do not affect a human listener as much as the machine listening methods.

SUMMARY

There is provided according to a first aspect an apparatus comprising means configured to: obtain two or more microphone audio signals; analyse the two or more microphone audio signals for a defined noise type; and process the two or more microphone audio signals based on the analysis to generate at least one audio signal suitable for automatic speech recognition.

The means configured to analyse the two or more microphone audio signals for the defined noise type may be configured to: determine energy estimates for the two or more microphone audio signals; determine correlation estimates between pairs of the two or more microphone audio signals; determine a defined noise type noise estimate based on the energy estimates for the two or more microphone audio signals and the correlation estimates between pairs of the two or more microphone audio signals; and determine a defined noise type noise frequency threshold below which the defined noise type noise is a dominant disturbance based on the defined noise type noise estimate, the energy estimates for the two or more microphone audio signals and the correlation estimates between pairs of the two or more microphone audio signals.

The means configured to analyse the two or more microphone audio signals for the defined noise type may be configured to: determine energy estimates for the two or more microphone audio signals; determine coherence estimates between pairs of the two or more microphone audio signals; determine a defined noise type noise estimate based on the energy estimates for the two or more microphone audio signals and the coherence estimates between pairs of the two or more microphone audio signals; and determine a defined noise type noise frequency threshold below which the defined noise type noise is a dominant disturbance based on the defined noise type noise estimate, the energy estimates for the two or more microphone audio signals and the coherence estimates between pairs of the two or more microphone audio signals.

The means configured to process the two or more microphone audio signals based on the analysis to generate at least one audio signal suitable for automatic speech recognition may be configured to: select, for frequency bands below the defined noise type noise frequency threshold, a lowest energy microphone audio signal of the two or more microphone audio signals; and select, for frequency bands above the defined noise type frequency threshold, a highest energy microphone audio signal of the two or more audio signals.

The means configured to process the two or more microphone audio signals based on the analysis to generate at least one audio signal suitable for automatic speech recognition may be configured to: select, for frequency bands, below the defined noise type noise frequency threshold, a lowest energy microphone audio signal of the two or more microphone audio signals; and generate, for frequency bands above the defined noise type noise frequency threshold, a filter-and-sum combination of the two or more microphone audio signals.

The means configured to generate, for frequency bands above the defined noise type noise frequency threshold, a filter-and-sum combination of the two or more microphone audio signals may be configured to: time-align the two or more microphone audio signals; and generate a weighted average of the time-aligned two or more microphone audio signals.

The means configured to time-align the two or more microphone audio signals may be configured to: estimate a direction of sound arrival; and filter the two or more microphone audio signals based on the direction of sound arrival and a microphone configuration defining the relative locations of microphones configured to capture the two or more microphone audio signals.

The means configured to estimate a direction of sound arrival may be configured to perform one of: estimate a direction of sound arrival based on a cross-correlation analysis of the two or more audio signals; estimate a direction of sound arrival based on a cross-correlation analysis of the two or more audio signals when an active speech segment is detected; estimate a direction of sound arrival based on a cross-correlation analysis of the two or more audio signals when an active speech segment is detected and a noise level of the two or more audio signals is lower than a threshold value.

The defined noise type may comprise at least one of: structure borne noise; motor noise; actuator noise; wind noise; and handling noise.

The means configured to obtain two or more microphone audio signals may be configured to, at least one of: receive the two or more microphone audio signals from the two or more microphones; and retrieve the two or more microphone audio signals from memory.

The two or more microphone audio signals may be captured from at least one of: directional microphones; pressure microphones; and pressure gradient microphones.

The two or more microphone audio signals may be captured from directional microphones, and the means configured to process the two or more microphone audio signals based on the analysis to generate at least one audio signal suitable for automatic speech recognition may be configured to: filter-and-sum the two or more microphone audio signals to generate a directional audio signal.

According to a second aspect there is provided a method comprising: obtaining two or more microphone audio signals; analysing the two or more microphone audio signals for a defined noise type; and processing the two or more microphone audio signals based on the analysing to generate at least one audio signal suitable for automatic speech recognition.

Analysing the two or more microphone audio signals for the defined noise type may comprise: determining energy estimates for the two or more microphone audio signals; determining correlation estimates between pairs of the two or more microphone audio signals; determining a defined noise type noise estimate based on the energy estimates for the two or more microphone audio signals and the correlation estimates between pairs of the two or more microphone audio signals; and determining a defined noise type noise frequency threshold below which the defined noise type noise is a dominant disturbance based on the defined noise type noise estimate, the energy estimates for the two or more microphone audio signals and the correlation estimates between pairs of the two or more microphone audio signals.

Processing the two or more microphone audio signals based on the analysing to generate at least one audio signal suitable for automatic speech recognition may comprise:

selecting, for frequency bands below the defined noise type noise frequency threshold, a lowest energy microphone audio signal of the two or more audio signals; and selecting, for frequency bands above the defined noise type frequency threshold, a highest energy microphone audio signal of the two or more audio signals.

Processing the two or more microphone audio signals based on the analysing to generate at least one audio signal suitable for automatic speech recognition may comprise: selecting, for frequency bands, below the defined noise type noise frequency threshold, a lowest energy microphone audio signal of the two or more microphone audio signals; and generating, for frequency bands above the defined noise type noise frequency threshold, a filter-and-sum combination of the two or more microphone audio signals.

Generating, for frequency bands above the defined noise type noise frequency threshold, a filter-and-sum combination of the two or more microphone audio signals may comprise: time-aligning the two or more microphone audio signals; and generating a weighted average of the time-aligned two or more microphone audio signals.

Time-aligning the two or more microphone audio signals may comprise: estimating a direction of sound arrival; and filtering the two or more microphone audio signals based on the direction of sound arrival and a microphone configuration defining the relative locations of microphones configured to capture the two or more microphone audio signals.

Estimating a direction of sound arrival may comprise one of: estimating a direction of sound arrival based on a cross-correlation analysing of the two or more audio signals; estimating a direction of sound arrival based on a cross-correlation analysing of the two or more audio signals when an active speech segment is detected; estimating a direction of sound arrival based on a cross-correlation analysing of the two or more audio signals when an active speech segment is detected and a noise level of the two or more audio signals is lower than a threshold value.

The defined noise type may comprise at least one of: structure borne noise; motor noise; actuator noise; wind noise; and handling noise.

Obtaining two or more microphone audio signals may comprise, at least one of: receiving the two or more microphone audio signals from the two or more microphones; and retrieving the two or more microphone audio signals from memory.

The two or more microphone audio signals may be captured from at least one of: directional microphones; pressure microphones; and pressure gradient microphones.

The two or more microphone audio signals may be captured from directional microphones, and processing the two or more microphone audio signals based on the analysing to generate at least one audio signal suitable for automatic speech recognition may comprise: filter-and-summing the two or more microphone audio signals to generate a directional audio signal.

According to a third aspect there is provided an apparatus comprising at least one processor and at least one memory including a computer program code, the at least one memory and the computer program code configured to, with the at least one processor, cause the apparatus at least to: obtain two or more microphone audio signals; analyse the two or more microphone audio signals for a defined noise type; and process the two or more microphone audio signals based on the analysis to generate at least one audio signal suitable for automatic speech recognition.

The apparatus caused to analyse the two or more microphone audio signals for the defined noise type may be caused to: determine energy estimates for the two or more microphone audio signals; determine correlation estimates between pairs of the two or more microphone audio signals; determine a defined noise type noise estimate based on the energy estimates for the two or more microphone audio signals and the correlation estimates between pairs of the two or more microphone audio signals; and determine a defined noise type noise frequency threshold below which the defined noise type noise is a dominant disturbance based on the defined noise type noise estimate, the energy estimates for the two or more microphone audio signals and the correlation estimates between pairs of the two or more microphone audio signals.

The apparatus caused to process the two or more microphone audio signals based on the analysis to generate at least one audio signal suitable for automatic speech recognition may be caused to: select, for frequency bands below the defined noise type noise frequency threshold, a lowest energy microphone audio signal of the two or more microphone audio signals; and select, for frequency bands above the defined noise type frequency threshold, a highest energy microphone audio signal of the two or more audio signals.

The apparatus caused to process the two or more microphone audio signals based on the analysis to generate at least one audio signal suitable for automatic speech recognition may be caused to: select, for frequency bands, below the defined noise type noise frequency threshold, a lowest energy microphone audio signal of the two or more microphone audio signals; and generate, for frequency bands above the defined noise type noise frequency threshold, a filter-and-sum combination of the two or more microphone audio signals.

The apparatus caused to generate, for frequency bands above the defined noise type noise frequency threshold, a filter-and-sum combination of the two or more microphone audio signals may be caused to: time-align the two or more microphone audio signals; and generate a weighted average of the time-aligned two or more microphone audio signals.

The apparatus caused to time-align the two or more microphone audio signals may be caused to: estimate a direction of sound arrival; and filter the two or more microphone audio signals based on the direction of sound arrival and a microphone configuration defining the relative locations of microphones configured to capture the two or more microphone audio signals.

The apparatus caused to estimate a direction of sound arrival may be caused to perform one of: estimate a direction of sound arrival based on a cross-correlation analysis of the two or more audio signals; estimate a direction of sound arrival based on a cross-correlation analysis of the two or more audio signals when an active speech segment is detected; estimate a direction of sound arrival based on a cross-correlation analysis of the two or more audio signals when an active speech segment is detected and a noise level of the two or more audio signals is lower than a threshold value.

The defined noise type may comprise at least one of: structure borne noise; motor noise; actuator noise; wind noise; and handling noise.

The apparatus caused to obtain two or more microphone audio signals may be caused to, at least one of: receive the two or more microphone audio signals from the two or more microphones; and retrieve the two or more microphone audio signals from memory.

The two or more microphone audio signals may be captured from at least one of: directional microphones; pressure microphones; and pressure gradient microphones.

The two or more microphone audio signals may be captured from directional microphones, and the apparatus caused to process the two or more microphone audio signals based on the analysis to generate at least one audio signal suitable for automatic speech recognition may be caused to: filter-and-sum the two or more microphone audio signals to generate a directional audio signal.

According to a fourth aspect there is provided an apparatus comprising: means for obtaining two or more microphone audio signals; means for analysing the two or more microphone audio signals for a defined noise type; and means for processing the two or more microphone audio signals based on the analysing to generate at least one audio signal suitable for automatic speech recognition.

The means for analysing the two or more microphone audio signals for the defined noise type may comprise: means for determining energy estimates for the two or more microphone audio signals; means for determining correlation estimates between pairs of the two or more microphone audio signals; means for determining a defined noise type noise estimate based on the energy estimates for the two or more microphone audio signals and the correlation estimates between pairs of the two or more microphone audio signals; and means for determining a defined noise type noise frequency threshold below which the defined noise type noise is a dominant disturbance based on the defined noise type noise estimate, the energy estimates for the two or more microphone audio signals and the correlation estimates between pairs of the two or more microphone audio signals.

The means for processing the two or more microphone audio signals based on the analysing to generate at least one audio signal suitable for automatic speech recognition may comprise: means for selecting, for frequency bands below the defined noise type noise frequency threshold, a lowest energy microphone audio signal of the two or more microphone audio signals; and means for selecting, for frequency bands above the defined noise type frequency threshold, a highest energy microphone audio signal of the two or more audio signals.

The means for processing the two or more microphone audio signals based on the analysing to generate at least one audio signal suitable for automatic speech recognition may comprise: means for selecting, for frequency bands, below the defined noise type noise frequency threshold, a lowest energy microphone audio signal of the two or more microphone audio signals; and means for generating, for frequency bands above the defined noise type noise frequency threshold, a filter-and-sum combination of the two or more microphone audio signals.

The means for generating, for frequency bands above the defined noise type noise frequency threshold, a filter-and-sum combination of the two or more microphone audio signals may comprise: means for time-aligning the two or more microphone audio signals; and means for generating a weighted average of the time-aligned two or more microphone audio signals.

The means for time-aligning the two or more microphone audio signals may comprise: means for estimating a direction of sound arrival; and means for filtering the two or more microphone audio signals based on the direction of sound arrival and a microphone configuration defining the relative locations of microphones configured to capture the two or more microphone audio signals.

The means for estimating a direction of sound arrival may comprise one of: means for estimating a direction of sound arrival based on a cross-correlation analysing of the two or more audio signals; means for estimating a direction of sound arrival based on a cross-correlation analysing of the two or more audio signals when an active speech segment is detected; means for estimating a direction of sound arrival based on a cross-correlation analysing of the two or more audio signals when an active speech segment is detected and a noise level of the two or more audio signals is lower than a threshold value.

The defined noise type may comprise at least one of: structure borne noise; motor noise; actuator noise; wind noise; and handling noise.

The means for obtaining two or more microphone audio signals may comprise, at least one of: means for receiving the two or more microphone audio signals from the two or more microphones; and means for retrieving the two or more microphone audio signals from memory.

The two or more microphone audio signals may be captured from at least one of: directional microphones; pressure microphones; and pressure gradient microphones.

The two or more microphone audio signals may be captured from at least one directional microphone, and the means for processing the two or more microphone audio signals based on the analysing to generate at least one audio signal suitable for automatic speech recognition may comprise: means for filter-and-summing the two or more microphone audio signals to generate a directional audio signal.

According to a fifth aspect there is provided a computer program comprising instructions [or a computer readable medium comprising program instructions] for causing an apparatus to perform at least the following: obtaining two or more microphone audio signals; analysing the two or more microphone audio signals for a defined noise type; and processing the two or more microphone audio signals based on the analysing to generate at least one audio signal suitable for automatic speech recognition.

Analysing the two or more microphone audio signals for the defined noise type may cause the apparatus to perform: determining energy estimates for the two or more microphone audio signals; determining correlation estimates between pairs of the two or more microphone audio signals; determining a defined noise type noise estimate based on the energy estimates for the two or more microphone audio signals and the correlation estimates between pairs of the two or more microphone audio signals; and determining a defined noise type noise frequency threshold below which the defined noise type noise is a dominant disturbance based on the defined noise type noise estimate, the energy estimates for the two or more microphone audio signals and the correlation estimates between pairs of the two or more microphone audio signals.

Processing the two or more microphone audio signals based on the analysing to generate at least one audio signal suitable for automatic speech recognition may cause the apparatus to perform: selecting, for frequency bands below the defined noise type noise frequency threshold, a lowest energy microphone audio signal of the two or more microphone audio signals; and selecting, for frequency bands above the defined noise type frequency threshold, a highest energy microphone audio signal of the two or more audio signals.

Processing the two or more microphone audio signals based on the analysing to generate at least one audio signal suitable for automatic speech recognition may cause the apparatus to perform: selecting, for frequency bands below the defined noise type noise frequency threshold, a lowest energy microphone audio signal of the two or more microphone audio signals; and generating, for frequency bands above the defined noise type noise frequency threshold, a filter-and-sum combination of the two or more microphone audio signals.

Generating, for frequency bands above the defined noise type noise frequency threshold, a filter-and-sum combination of the two or more microphone audio signals may cause the apparatus to perform: time-aligning the two or more microphone audio signals; and generating a weighted average of the time-aligned two or more microphone audio signals.

Time-aligning the two or more microphone audio signals may cause the apparatus to perform: estimating a direction of sound arrival; and filtering the two or more microphone audio signals based on the direction of sound arrival and a microphone configuration defining the relative locations of microphones configured to capture the two or more microphone audio signals.

Estimating a direction of sound arrival may cause the apparatus to perform one of: estimating a direction of sound arrival based on a cross-correlation analysing of the two or more audio signals; estimating a direction of sound arrival based on a cross-correlation analysing of the two or more audio signals when an active speech segment is detected; estimating a direction of sound arrival based on a cross-correlation analysing of the two or more audio signals when an active speech segment is detected and a noise level of the two or more audio signals is lower than a threshold value.

The defined noise type may comprise at least one of: structure borne noise; motor noise; actuator noise; wind noise; and handling noise.

Obtaining two or more microphone audio signals may cause the apparatus to perform at least one of: receiving the two or more microphone audio signals from the two or more microphones; and retrieving the two or more microphone audio signals from memory.

The two or more microphone audio signals may be captured from at least one of: directional microphones; pressure microphones; and pressure gradient microphones.

The two or more microphone audio signals may be captured from at least one directional microphone, and processing the two or more microphone audio signals based on the analysing to generate at least one audio signal suitable for automatic speech recognition may cause the apparatus to perform: filter-and-summing the two or more microphone audio signals to generate a directional audio signal.

According to a sixth aspect there is provided a non-transitory computer readable medium comprising program instructions for causing an apparatus to perform at least the following: obtaining two or more microphone audio signals; analysing the two or more microphone audio signals for a defined noise type; and processing the two or more microphone audio signals based on the analysing to generate at least one audio signal suitable for automatic speech recognition.

According to a seventh aspect there is provided an apparatus comprising: obtaining circuitry configured to obtain two or more microphone audio signals; analysing the two or more microphone audio signals for a defined noise type; and processing circuitry configured to process the two or more microphone audio signals based on the analysing to generate at least one audio signal suitable for automatic speech recognition.

According to an eighth aspect there is provided a computer readable medium comprising program instructions for causing an apparatus to perform at least the following: obtaining two or more microphone audio signals; analysing the two or more microphone audio signals for a defined noise type; and processing the two or more microphone audio signals based on the analysing to generate at least one audio signal suitable for automatic speech recognition. An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective audio signal processing for improving automatic speech recognition in mobile devices.

The concept as discussed further in the embodiments hereafter attempt to provide audio signal processing which can over varying recording conditions produce audio signals suitable for automatic speech recognition and may in some embodiments be used within mobile devices.

In general, automatic speech recognition systems achieve a good performance when the microphone position is close to the user's mouth, the frequency response of the audio system is flat and the amount of acoustic disturbances, such as background noise, are minimized.

In a typical mobile ASR scenario, the quality of recorded audio can be disturbed by aspects such as:

User behaviour
    User can hold the device in different orientations, which means that the preferred microphone (microphone signal that would provide the best ASR performance) can vary depending on how the user is holding the device or where the device is placed relative to the talking user. In most cases the microphone that is closest to the user would also have the best SNR.
    User's hands can block the microphone port, which attenuates the desired signal level in the recording microphone.
    User holding the device can cause handling noise (scratching, tapping) reducing the SNR.

Acoustic environment
    Background noise can be a dominant source of interference which means that the desired speech signal has to be loud or the sound source, i.e. user's mouth, has to be close to the recording microphone to increase the SNR of the captured signal.

Environmental conditions
    Wind noise causes turbulence in acoustic pressure and introduces high levels of disturbances.
    Frequency content of the wind noise can vary depending on both the device implementation as well as wind characteristics.

Figure 5:
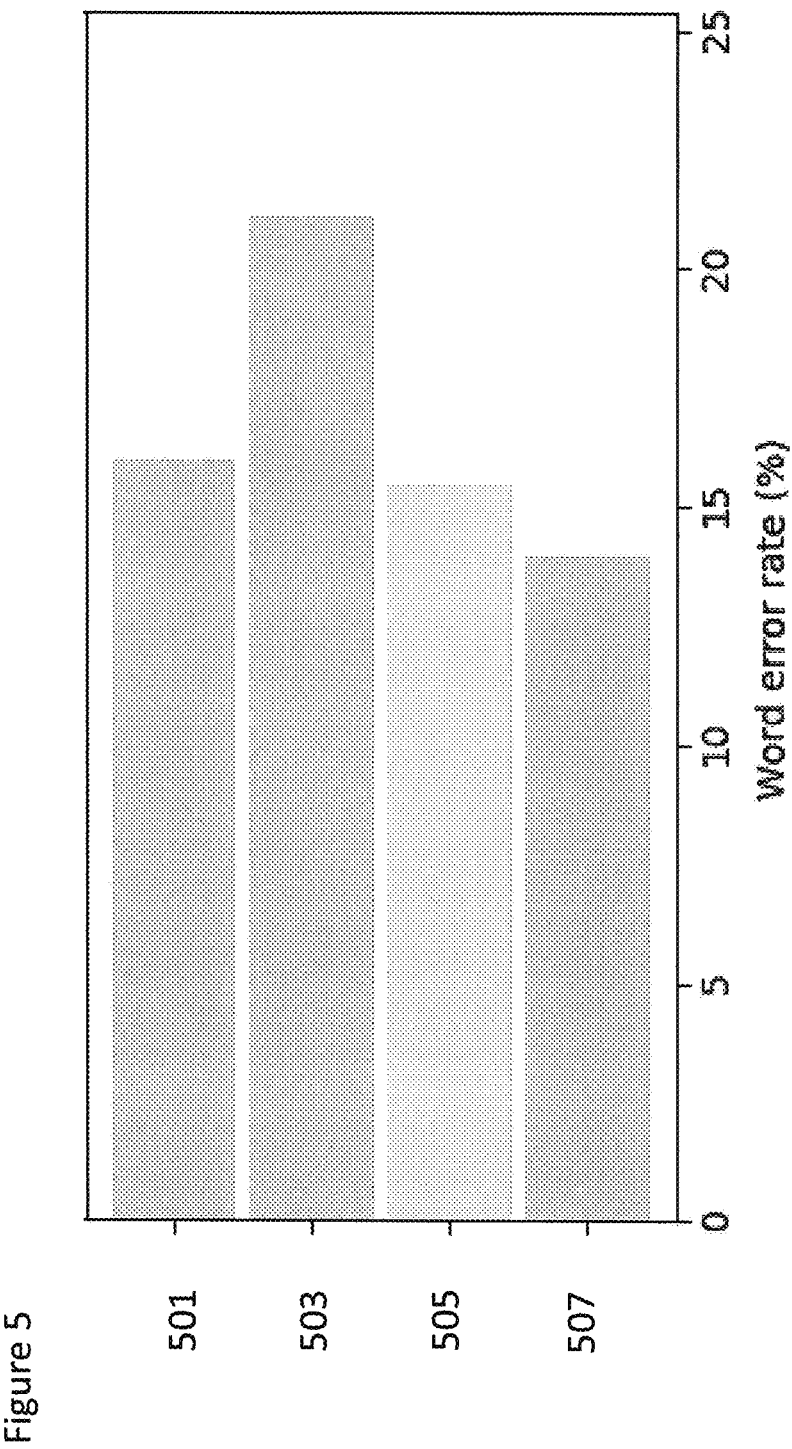
FIG. 5 shows a graph of measured word error rates for an indoor recording with ambient noise without contribution of wind noise.
Figure 6:
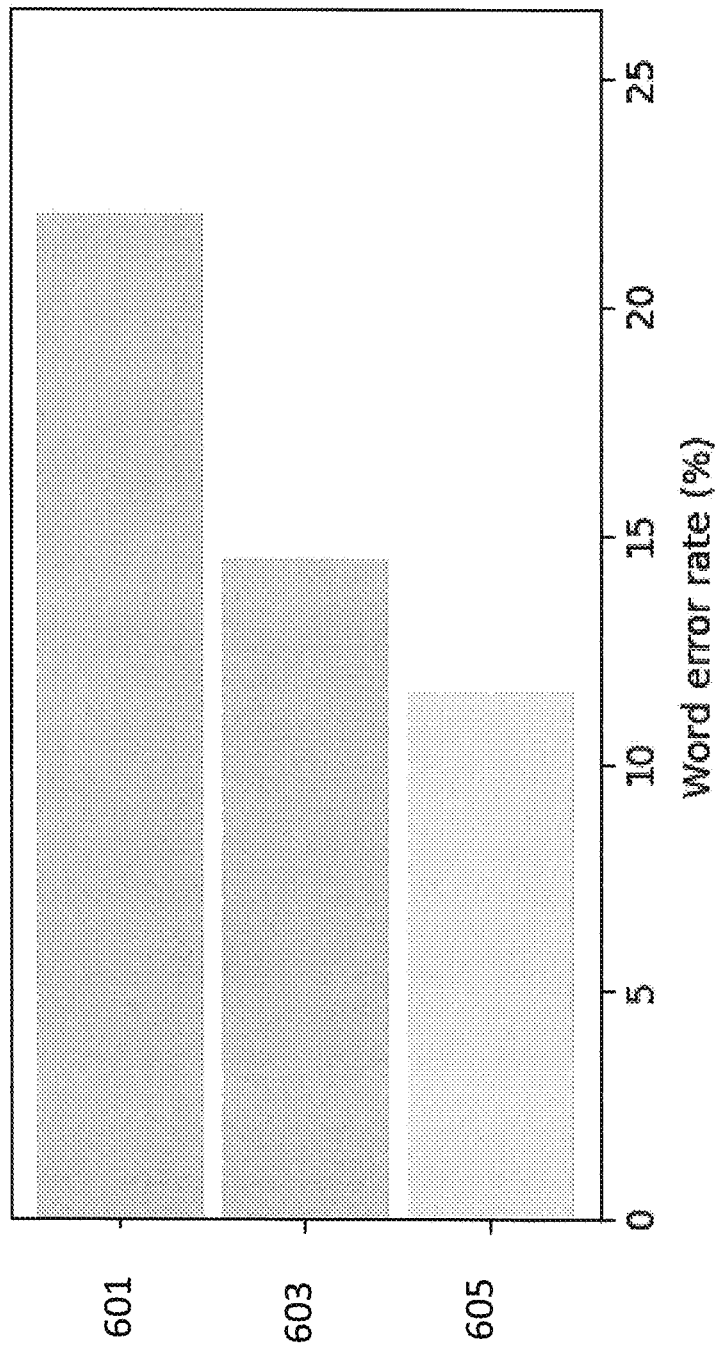
FIG. 6 shows a graph of measured word error rates in outdoor recording in windy conditions.
Figure 7:
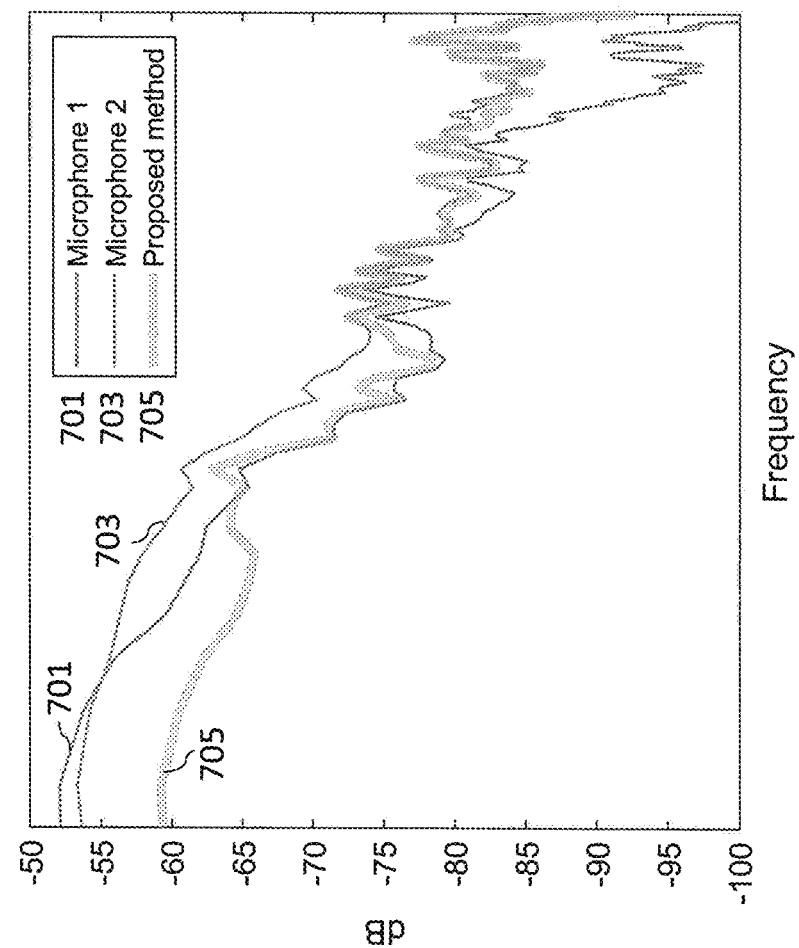
FIG. 7 shows a spectra of a short speech segment of microphone signals and the output of some embodiments in conditions corresponding to those shown with respect to FIG. 6.

Effective means of SNR improvement vary depending on conditions
    Input having the maximum or the minimum power may provide the best SNR Example word error rates and spectra showing the recognition performance of ASR evaluated in various conditions is shown in FIGS. 5 to 7. These examples use speech material from the Speecon database and a Speech-to-Text service. About 1 hour 45 minutes (about 10,000 words) of read sentences spoken by native American English talkers were selected from the database. The sentences were played back through a loudspeaker and recorded with a mobile device in different conditions. The recorded audio was sent to the Speech-to-Text service and the text output was compared with sentence annotations from the speech database. To quantify the ASR performance, the word error rate (WER) was calculated as the ratio of incorrectly recognized words (insertions, deletions, and substitutions) to the total number of words in the annotations.

The results of a first example experiment showing the effect of microphone placement and shadowing where speech was recorded with a mobile device in landscape position in a quiet room with the speech source in front of the device is shown in FIG. 5. Ambient noise (Shopping centre noise) without contribution of wind noise was mixed with the microphone signals at a signal-to-noise ratio of 10 dB. FIG. 5 shows a graph of the word error rate 501 for microphone 1 and a word error rate 503 for microphone 2. The example results as shown in FIG. 5 suggest that it may be beneficial to select a microphone which is located acoustically closer to the speaker (microphone 1 which has a lower word error rate compared to microphone 2) and not shadowed by the device (when the microphone signals are not corrupted by wind noise).

The results of a further experiment are shown by FIG. 6 which shows the effect of simple wind noise reduction on ASR performance. A mobile device with two microphones located at the ends of the device was held by an artificial hand at a distance of 0.3 m from a loudspeaker in windy outdoor conditions. The microphones captured the speech signal from the loudspeaker but also moderate wind noise and some natural sounds from the environment. Microphone 2 was closer to the loudspeaker. In the graph shown in FIG. 6 the microphone 1 word error rate 601 and microphone 2 word error rate 603 bars indicate WER results where the microphones 1 and 2 are both affected by the wind noise and WER results can be improved by the proposed wind noise reduction method beyond the selection of the strongest microphone.

The apparatus described implementing the following examples is a mobile device which has two or more microphones. The mobile device is configured to be able to estimate:

acoustic characteristics of microphone inputs relevant for ASR performance;

an amount of disturbances on several frequency ranges; and a frequency $f_{wind}$ below which the wind noise is the dominant disturbance degrading the ASR performance.

Furthermore the apparatus is configured to output a wind noise reduced mono signal up to the frequency $f_{wind}$ and an ASR optimized (frequency balance, SNR in ambient noise) mono signal above the frequency $f_{wind}$.

The concept and the embodiments implementing the concept may be summarized as:

1. ASR typically requires a mono audio signal and performs best with high SNR.

2. A multi-microphone device can combine the microphone channels in time-frequency tiles to generate a mono audio output with favourable signal characteristics at each time and frequency.

3. Wind noise can corrupt some microphone channels more severely than others. Selecting the channel with the lowest energy in a time-frequency tile can provide an audio signal with a minimum amount of wind noise at each time and frequency.

4. Acoustic shadowing by the device, blocking of a microphone, and noise in the environment may degrade the SNR of a microphone channel. In these cases, selecting a strongest audio signal from a microphone (or a strongest audio channel) (where the strongest may be the one with the highest energy) in a time-frequency tile may provide a good speech SNR at each time and frequency.

5. Wind noise typically occurs at low audio frequencies, so it is beneficial to select the weakest audio signal from the microphone/channel (where the weakest may be the one with the lowest energy) at low frequencies and the strongest audio signal from the microphone/channel at higher frequencies.

6. Wind noise can be detected by a suitable means, e.g., cross-correlation and energy difference between the audio signals from the microphones/channels. Based on such measurements, a threshold frequency $f_{wind}$ can be determined between the weakest and strongest selection strategies.

7. Alternatively, a weighted sum of the audio signals from the microphones/channels can be used instead of maximum energy selection at frequencies not corrupted by wind noise. This filter-and-sum beamforming attenuates uncorrelated noise and provides directional filtering emphasizing sound from desired direction (or directions) while attenuating sounds from another direction or directions. In these embodiments the audio signals from the microphones are appropriately time-aligned to emphasize sound from the direction of the talker.

In the examples presented herein the apparatus and methods are described with reference to attempting to reduce a defined noise type in the form of handling or wind noise. It would be understood that in some embodiments other types of noise can be handled in a similar manner to that described herein. For example structure borne sound or noise can be a noise type where some mechanical disturbance introduces noise components that are transmitted in a non-linear manner and form part of the captured audio signals. Other noise type may be motor noise and mechanical actuator noise.

Figure 1:
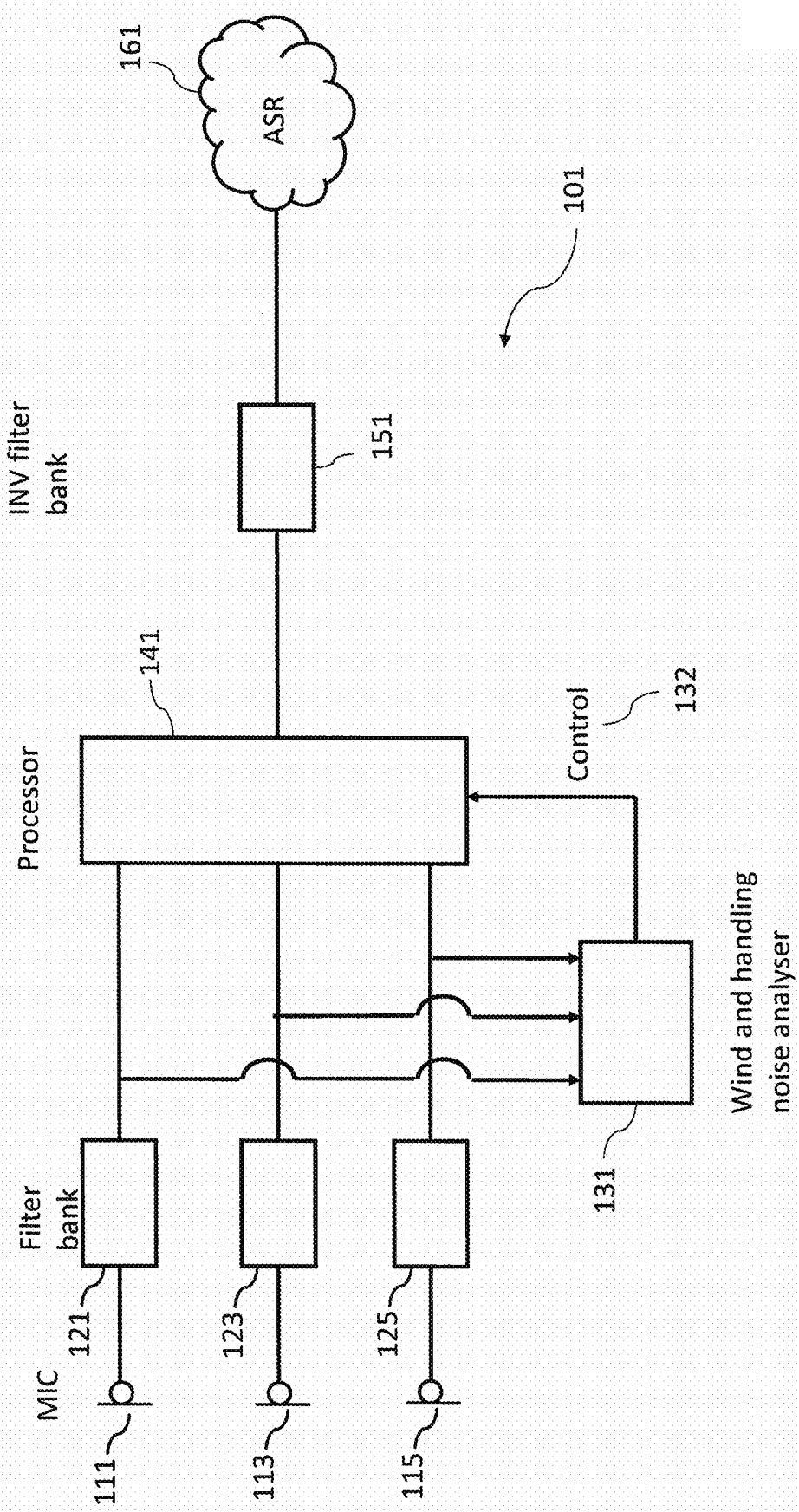
FIG. 1 shows schematically a system of apparatus suitable for implementing some embodiments.

With respect to FIG. 1 is shown an example apparatus suitable for implementing some embodiments. In the embodiments shown the apparatus is a mobile device on which all of the aspects can be implemented. However in some embodiments the methods may be implemented on multiple devices which are able to communicate with each other. For example in some embodiments the capture microphones, the audio signal processor and the ASR aspects are implemented in separate devices (for example the audio signal processing implemented on a server separate from the capture device, or the ASR implemented on a server separate from the audio signal processor/capture device).

In some embodiments the mobile device 101 comprises two or more microphones. In the example shown in FIG. 1 the mobile device comprises a first microphone 111, a second microphone 113 and a z'th microphone 115. The microphones in some embodiments may be located on or within the mobile device and in any suitable configuration or arrangement. In some embodiments the microphone location or positions are defined with respect to the form factor of the apparatus. For example in some embodiments microphones are placed on different (opposite) sides of the mobile device. Furthermore in some embodiments the microphone configuration or arrangement is decided according to algorithms or requirements such as audio focusing towards a desired audio source direction (for example focusing to a reference direction such as a front direction for the mobile device) or based on telephony requirements (type test requirements).

The microphones may be any suitable type of microphone and be configured to convert acoustic waves into electrical signals. In some embodiments these electrical signals are analogue audio signals within the time domain. However in some embodiments the electrical signals can be in a suitable digital format or in some embodiments be in frequency domain audio signals. The microphones in some embodiments are directional microphones configured to generate directional microphone components. Additionally in some embodiments the microphones may be pressure or pressure gradient microphones.

In this example each microphone 111, 113, 115 is configured to provide an audio signal $x_m(n')$, where m is the microphone index and n' is the sample index. The time interval is N samples long, and n denotes the time interval index of a frequency transformed signal. In the examples shown herein the microphone capture and processing is carried out in a real-time context. However it is understood that in some embodiments the audio signals are captured or generated at a first time and then processed at a later time. In some embodiments the system therefore comprises a memory or storage function suitable for storing the captured audio signals (or in some embodiments encoded versions of the captured audio signals) before the audio signals are received or retrieved for processing.

One type of effective directional microphones or microphones arrays with super-directive sensitivity characteristics can amplify defined noise types due to positive White Noise Gain (WNG). Thus the benefit of the proposed method may be emphasized even further if the directional microphones are configured to amplify defined noise types.

Thus for example when one microphone signal is corrupted, beamforming with other microphone signals can degrade quality and if a filter and sum filter 411 is tuned to have super-directive characteristics, wind noise reduction in 407 can prevent a boosting of wind noise.

The microphones may in some embodiments be configured to output the audio signals to a filterbank. In the example shown in FIG. 1 the filterbank comprises a separate filter 121, 123, 125 associated with each microphone 111, 113, 115 respectively. The filter bank is configured to apply a sinusoidal window on each microphone input for sample indices n'=(n−1)N, . . . , (n+1)N−1, and transform the windowed input signal sequences into the frequency domain by a Fourier transform. In the frequency-transformed signal $x_m(k,n)$ k is the frequency bin index. The frequency domain representation is grouped into B sub-bands with indices b=0, ..., B−1, where each sub-band has a lowest bin $k_{b,low}$ and the highest bin and $k_{b,high}$, includes also the bins in between. For example in some embodiments the filter bank is a short-time Fourier transform (STFT) or any other suitable filter bank such as the complex-modulated quadrature mirror filter (QMF) bank.

The output of each filter 121, 123, 125, from the filterbank can be provided to the Wind and handling noise analyser 131 and to the processor 141.

The wind and handling noise analyser 131 is configured to receive the outputs from the filters 121, 123, 125 and analyse these audio signals to determine the power estimates of the microphone audio signals and furthermore correlation estimates between the microphone audio signals. From these values the wind and handling noise analyser 131 can be configured to determine an estimate of the amount of wind noise/handling noise and furthermore estimate a threshold frequency associated with the wind noise $f_{wind}$. In some embodiments a coherence or other similar parameter is determined and used instead of correlation estimates.

As discussed above wind noise is a big problem in mobile device ASR systems, because the devices are used outside but efficient mechanical wind shields are too large and impractical. Wind noise disturbances vary rapidly as a function of time, frequency range and location. On lower frequencies, the wind noise is often the dominant disturbance and the optimal ASR input is wind noise reduced processed signal.

Handling noise is also a problem for ASR performance in mobile devices. Handling noise may resemble wind noise and can be removed by similar processing.

Wind noise can be detected by comparing energies and cross-correlations of the microphone signals.

Because the user can hold the device in different orientations, the acoustic path from the mouth to the microphone varies. The frequency range of the ASR input may be rather wide, e.g. from 100 Hz to 8000 Hz. If the mobile device shadows the acoustic path from the mouth to the microphone, the SNR of the higher frequencies may decrease 10 dB-15 dB. In addition, the ASR sees imprecise frequency balance.

If the user blocks a microphone by accident, even partially, the change of the acoustic path can be remarkable. An acoustic waveform can be presented as a sum of intrinsic and scattered components to model waveform propagation passing a solid, acoustically non-transparent, object. In this document an acoustic waveform scattering caused by device mechanics is referred simply as a shadowing effect. Blocking resembles to the shadowing effect and the blocked microphone has attenuation especially on higher frequencies.

As the distance between the microphones is short compared to the wavelength of sound in the lower frequency bands, the wind and handling noise analyser 131 is configured for the lower frequency bands to determine a power estimate of the signal from a first microphone as $$E_1(b,n) = \sum_{k=k_{b,low}}^{k_{b,high}} |X_1(k,n)|^2$$

Additionally the wind and handling noise analyser 131 is configured to determine a cross-correlation estimate between a first microphone and a second microphone based on $$C_{1,2}(b,n) = \sum_{k=k_{b,low}}^{k_{b,high}} |X_1(k,n)X_2^*(k,n)|,$$

The wind and handling noise analyser 131 can furthermore be configured to determine whether there is noise in the audio signal from the first microphone and indicate it in a single bit where $$\text{Wind}_1(b,n) = E_1(b,n) > Th_{1,2}(b) * C_{1,2}(b,n).$$

In some embodiments where the device has more than two microphones, these estimates (and wind determinations) can be calculated for each microphone pair. For example $$E_2(b,n) = \sum_{k=k_{b,low}}^{k_{b,high}} |X_2(k,n)|^2$$

$$C_{2,3}(b,n) = \sum_{k=k_{b,low}}^{k_{b,high}} |X_2(k,n)X_3^*(k,n)|$$

$$\text{Wind}_2(b,n) = E_2(b,n) > Th_{2,3}(b) * C_{2,3}(b,n)$$

Additionally in some embodiments the wind and handling noise analyser 131 is configured to identify the highest band b among all microphones m marked as windy In other words the highest b for all microphones m where $\text{Wind}_m(b,n)=1$ is denoted as $b_{wind}(n)$.

The $b_{wind}(n)$ information can be passed to the processor 141 as a control signal 132.

In some embodiments, the correlation analysis may be limited to the frequency bands below a determined band $b=b_a$, $b_a<B-1$. In such embodiments it may be beneficial to skip analysis on the higher frequencies if the accuracy of the analysis decreases. For instance, the distance of microphones may be high or the microphones are located on different surfaces of the device and the shadowing effect becomes dominant. In general, mild wind noise is detected as low frequency hum. When the strength of the wind increases, both the power and frequency range of the wind noise increases. As a sufficient approximation, the highest detection result can be applied on all the highest bands $\text{Wind}_m(b,n) = \text{Wind}_m(b_a,n)$, $b=b_a+1, \ldots, B-1$.

In some embodiments the device comprises a (wind/handling noise) processor 141. The processor 141 can be configured to receive the audio signals for bands b=0, ..., $b_{wind}$ and furthermore the $b_{wind}(n)$ signals.

The signals from the wind and handling noise analyser $b_{wind}(n)$ indicates that the bands b=0, ..., $b_{wind}$ contain wind or handling noise and the processor should reduce the disturbances.

The processor 141 is configured to output a pre-processed mono output for the ASR system 161 to an inverse filterbank 151.

The device 101 may comprise an inverse filterbank 151 configured to receive the frequency-transformed signal and convert it back to a time domain audio signal which can be passed to the ASR system.

The ASR system 161 is configured to receive the mono audio signal output from the inverse filterbank 151 and perform automatic speech recognition.

Although the example shown in FIG. 1 shows a mono audio signal output from the processor/inverse filterbank, in some embodiments at least one audio signal is output. For example in some embodiments a multichannel output may be output in a situation where directional capture is steered towards different sources for in order to analyse separate audio source/talkers (in other words using a separate ASR instance for each audio source/talker in order to attempt to improve the error rate).

Figure 2:
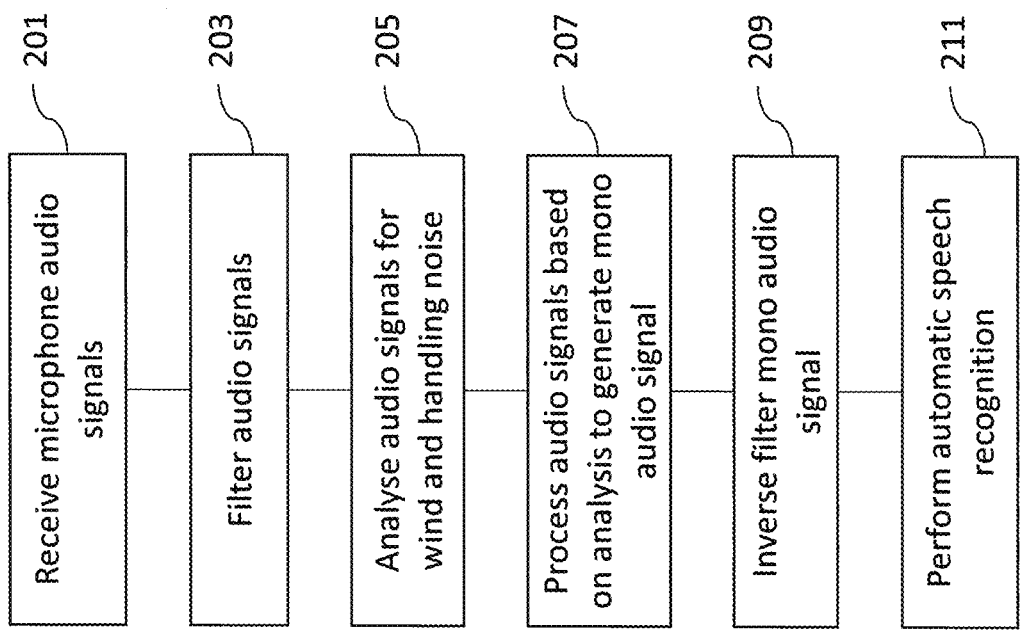
FIG. 2 shows a flow diagram of the operation of the system as shown in FIG. 1 according to some embodiments.

With respect to FIG. 2 an overview of the operation of the device is shown in further detail.

First the microphone audio signals are received (or otherwise obtained) as shown in FIG. 2 by step 201.

Then the microphone audio signals are filtered to convert them from the time to the transformed (for example Fourier or frequency) domain as shown in FIG. 2 by step 203.

The converted audio signals can then be analysed to determine the wind and handling noise parameters, such as energy, cross correlation, wind/handling noise contribution max-frequency as shown in FIG. 2 by step 205.

The audio signals can then be processed to attempt to reduce the effect of the wind/handling noise based on the wind and handling noise parameters to generate a suitable mono audio signal as shown in FIG. 2 by step 207.

The mono audio signal can then be converted back into a time domain mono audio signal by an inverse-filter as shown in FIG. 2 by step 209.

Finally the time domain mono audio signal can be passed to a suitable automatic speech recogniser/processor and automatic speech recognition performed as shown in FIG. 2 by step 211.

Figure 3:
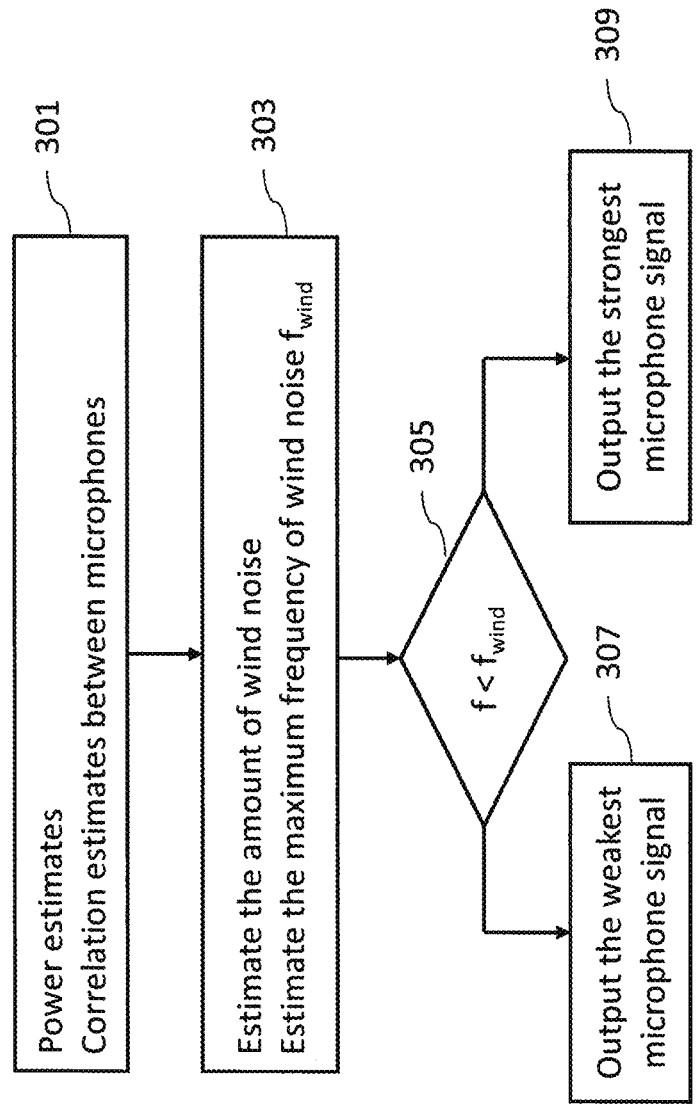
FIG. 3 shows a flow diagram of the first operations of the analyser and processor as shown in FIG. 1 according to some embodiments.

With respect to FIG. 3 is shown the operation of the processor 141 according to some embodiments. In some embodiments the processor is configured to output signal $X_{m0}(k,n)$, where $k=k_{b,low}, \ldots, k_{b,high}$ and m0 denotes the microphone signal corresponding to the microphone m having the minimum power $E_m(b,n)$. In mobile devices, as the microphones are located close to each other, the change of microphone on band b is a minor issue for the ASR system compared to disturbances caused by wind or handling noise. This method is robust even if all the other microphone signals are fully corrupted by the noise.

This type of processing may be suitable for mobile devices having only a few, typically 2-4, microphones. Thus, even if some microphones have high power disturbances typical for wind and handling noise, the ASR can be configured to receive the optimal mono input.

In the presence of wind or handling noise on the microphone array, the processing improves the SNR. However, it may lead to sub-optimal SNR in other conditions.

For example the user can hold the mobile device in different orientations and in most cases the microphone that is the (acoustically) closest to the user would also have the best SNR. Therefore, on the bands $b=b_{wind}+1, \ldots, B-1$, that do not contain wind or handling noise, the processing block outputs signal $X_{m0}(k,n)$, where $k=k_{b,low}, \ldots, k_{b,high}$ and m0 denotes the microphone signal corresponding to the microphone m having the maximum power $E_m(b,n)$. Thus, even if some microphones have weaker SNR due to longer distance, acoustic shadowing or microphone blocking, the ASR receives the optimal mono input.

The first operation, is to receive from the analyser 131 or obtain otherwise the power estimates and the correlation estimates between microphones as shown in FIG. 3 by step 301.

A further operation, is to receive from the analyser 131 or obtain otherwise the estimate of the amount of wind/handling noise and furthermore the maximum frequency of wind noise $f_{wind}$ as shown in FIG. 3 by step 303.

Then on a frequency by frequency band basis the frequency band is checked to determine whether it is below the maximum frequency of wind noise (or wind frequency threshold) $f_{wind}$ as shown in FIG. 3 by step 305.

Where the frequency is below the maximum frequency of wind noise (or wind frequency threshold) $f_{wind}$ then the processor is configured to select to output the weakest microphone audio signal as shown in FIG. 3 by step 307.

Where the frequency is above (or equal to) the maximum frequency of wind noise (or wind frequency threshold) $f_{wind}$ then the processor is configured to select to output the strongest microphone audio signal as shown in FIG. 3 by step 309.

Figure 4:
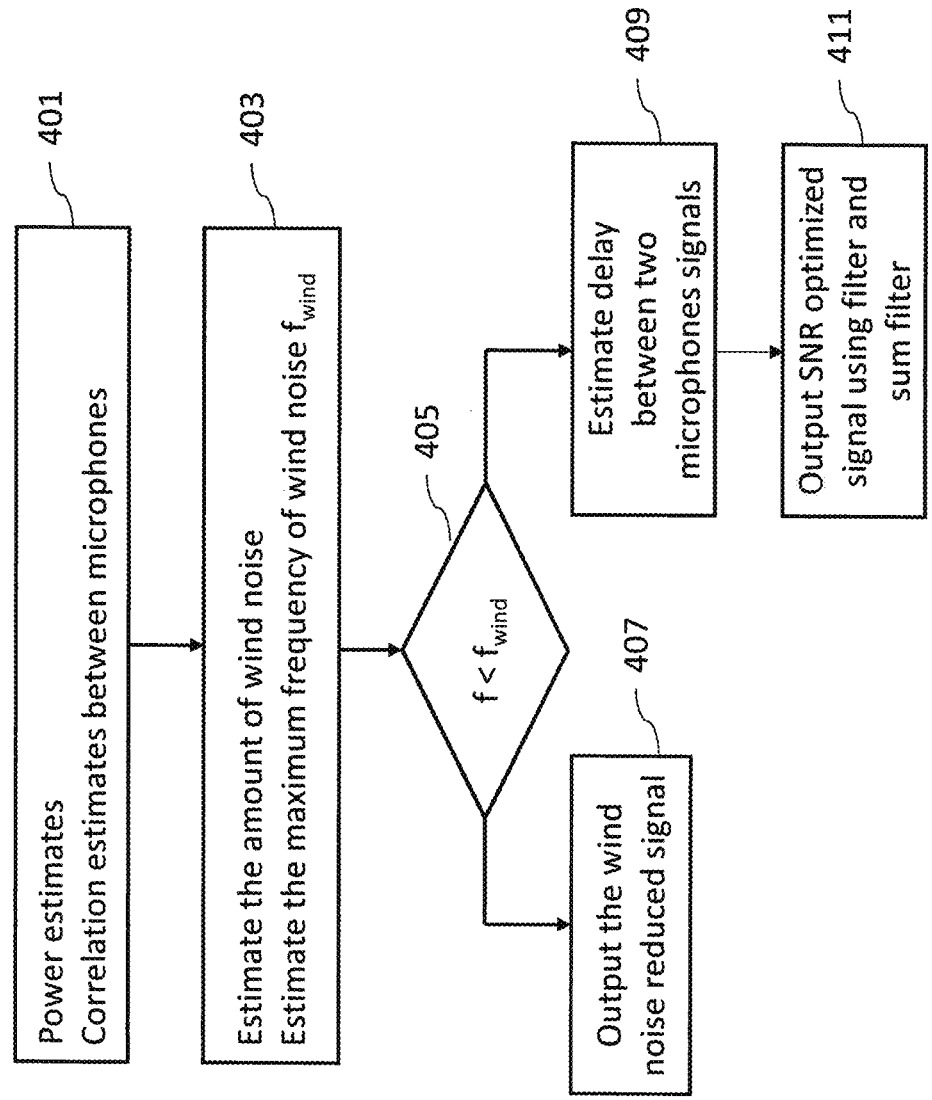
FIG. 4 shows a flow diagram of alternative operations of the analyser and processor as shown in FIG. 2 according to some embodiments.

With respect to FIG. 4 is shown the operation of the processor 141 according to some further embodiments. In these embodiments in order to improve the SNR in bands $b=b_{wind}+1, \ldots, B-1$ a weighted sum of microphone signals at each time and frequency is calculated.

This weighted sum may be considered to be similar to a filter-and-sum beamforming operation, which provides attenuation of uncorrelated noise and spatial filtering to emphasize the desired direction of sound arrival. In some embodiments a time-alignment of the microphone signals is required to compensate for the differences in propagation time from the speech source to the microphones.

In these embodiments in the bands $b=b_{wind}+1, \ldots, B-1$, that do not contain wind or handling noise, the processor 141 is configured to output a signal $X_{ds}(k,n)=\Sigma_m g_m(k) \hat{X}_m(k,n)$, where $k=k_{b,low}, \ldots, k_{b,high}$, $g_m(k)$ is transfer domain filter for microphone channel m and $\hat{X}_m(k,n)$ represents frequency-transformed signal for which the input signals have been time-aligned for the desired direction of arrival. In the simplest delay-and-sum case, each gain coefficient $$g_m(k) = \frac{1}{M},$$

∀k, where M is me number of microphone channels.

In some embodiments if the direction of the desired talker (or audio signal source) is known, the delays of microphone channels can be derived from the microphone locations and the expected direction of sound arrival. Otherwise, the delays have to be estimated from the microphone signals. For example, this estimate may be obtained by cross-correlation analysis during active speech segments and when the noise level is low.

The first operation, is to receive from the analyser 131 or obtain otherwise the power estimates and the correlation estimates between microphones as shown in FIG. 4 by step 401.

A further operation, is to receive from the analyser 131 or obtain otherwise the estimate of the amount of wind/handling noise and furthermore the maximum frequency of wind noise $f_{wind}$ as shown in FIG. 4 by step 403.

Then on a frequency by frequency band basis the frequency band is checked to determine whether it is below the maximum frequency of wind noise (or wind frequency threshold) $f_{wind}$ as shown in FIG. 4 by step 405.

Where the frequency is below the maximum frequency of wind noise (or wind frequency threshold) $f_{wind}$ then the processor is configured to output the wind reduced signal (which may for example be to select to output the weakest microphone audio signal) as shown in FIG. 4 by step 407.

Where the frequency is above (or equal to) the maximum frequency of wind noise (or wind frequency threshold) $f_{wind}$ then the processor is configured to estimate the delay between two microphone audio signals as shown in FIG. 4 by step 409.

Additionally the processor is configured to apply a filter-and-sum filter to the time aligned audio signals to output an optimized SNR audio signal as shown in FIG. 4 by step 411.

In some embodiments an occlusion or blockage of a microphone can be detected with a suitable 'occlusion detection' algorithm such as described in US application US20150312691A1. The output of such an algorithm can be used to control which microphones are available for WNR processing.

In some embodiments any time variation in the estimated features, such as channel correlation, power, and the highest frequency band affected by wind noise, can be smoothed using, a suitable low-pass filter, a time constant, counter or similar methods.

In some embodiments, to simplify computation, a wind noise estimation can be based purely on subband power estimates between microphone pairs instead of using cross-correlations.

In some embodiments the filter-and-sum processing can be replaced by another suitable method. For example the filter-and-sum processing methods may not be effective at high frequencies and other approaches, such as selecting the strongest microphone channel, can be used at higher frequencies instead.

In some embodiments the ASR algorithms are not as sensitive to processing delay as real-time conversational use cases and in such situations a lookahead of one or more time frames can be utilized to improve wind noise estimation.

Returning to FIGS. 5 to 7 the effect of embodiments as described herein when applied to the same measured examples is also shown.

For example in FIG. 5 shows an example mono audio signal output ASR word error rate 505 where the embodiments as described with respect to FIG. 3 are implemented and furthermore a word error rate 507 where the embodiments as described with respect to FIG. 4 are implemented. Thus with respect to ambient noise without any wind noise the effect of the processing results in a lower word error rate than the selection of either of the microphones.

FIG. 6 additionally shows an example mono audio signal output ASR word error rate 605 where the embodiments as described with respect to FIG. 3 are implemented. Thus with respect to wind noise the processing also results in a lower word error rate than the selection of either of the microphones. Furthermore FIG. 7 shows average spectra of a short speech segments of microphone signals (microphone 1 shown by plot 701 and microphone 2 by plot 703) and the output of the proposed method (shown by plot 705—the thicker line) in conditions corresponding to FIG. 6. At low frequencies, the wind noise reduction is active and selects the weaker microphone channel. Dynamic processing at low frequencies results in lower signal level compared to input channels. At high frequencies, the stronger microphone channel is selected as described in FIG. 3. The average performance improvement is shown in FIG. 6.

Figure 8:
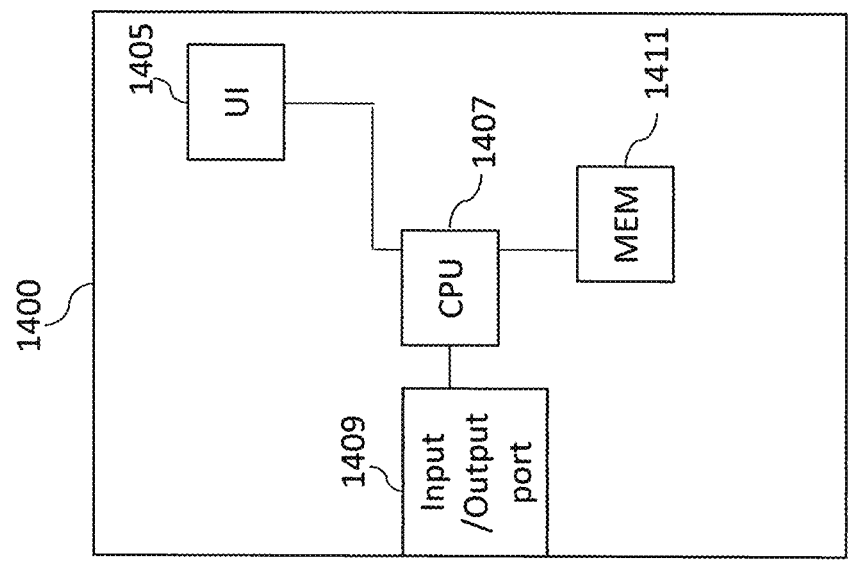
FIG. 8 shows schematically an example device suitable for implementing the apparatus shown.

With respect to FIG. 8 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable output signal to be transmitted to the ASR system.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including a computer program code, the at least one memory and the computer program code configured to, with the at least one processor, cause the apparatus at least to:
   obtain two or more microphone audio signals;
   analyse the two or more microphone audio signals for a defined noise type; and
   process the two or more microphone audio signals based on the analysis to generate at least one audio signal suitable for automatic speech recognition,
   wherein the apparatus is caused to analyse the two or more microphone audio signals by being further caused to:
   determine energy estimates for the two or more microphone audio signals;
   determine correlation estimates between pairs of the two or more microphone audio signals;
   determine a defined noise type estimate based on the energy estimates for the two or more microphone audio signals and the correlation estimates between pairs of the two or more microphone audio signals; and
   determine a defined noise type frequency threshold below which the defined noise type is a dominant disturbance based on the defined noise type estimate, the energy estimates for the two or more microphone audio signals and the correlation estimates between pairs of the two or more microphone audio signals.

2. The apparatus as claimed in claim 1, wherein the apparatus is caused to process the two or more microphone audio signals by being further caused to:
   select, for frequency bands below the defined noise type frequency threshold, a lowest energy microphone audio signal of the two or more microphone audio signals; and
   select, for frequency bands above the defined noise type frequency threshold, a highest energy microphone audio signal of the two or more audio signals.

3. The apparatus as claimed in claim 2, wherein the apparatus is further caused to:
   select, for frequency bands below the defined noise type frequency threshold, a lowest energy microphone audio signal of the two or more microphone audio signals; and
   generate, for frequency bands above the defined noise type frequency threshold, a filter-and-sum combination of the two or more microphone audio signals.

4. The apparatus as claimed in claim 3, wherein the apparatus is caused to generate the filter-and-sum combination by being further caused to:
   time-align the two or more microphone audio signals; and
   generate a weighted average of the time-aligned two or more microphone audio signals.

5. The apparatus as claimed in claim 3, wherein the apparatus is caused to time- align by being further caused to:
   estimate a direction of sound arrival; and
   filter the two or more microphone audio signals based on the direction of sound arrival and a microphone configuration defining the relative locations of microphones configured to capture the two or more microphone audio signals.

6. The apparatus as claimed in claim 5, wherein the apparatus is caused to estimate a direction of sound arrival by being further caused to one of:
   estimate a direction of sound arrival based on a cross-correlation analysis of the two or more audio signals;
   estimate a direction of sound arrival based on a cross-correlation analysis of the two or more audio signals when an active speech segment is detected; or
   estimate a direction of sound arrival based on a cross-correlation analysis of the two or more audio signals when an active speech segment is detected and a noise level of the two or more audio signals is lower than a threshold value.

7. The apparatus as claimed in claim 1, wherein the defined noise type comprises at least one of:
   structure borne noise;
   motor noise;
   actuator noise;

wind noise; or handling noise.

8. The apparatus as claimed in claim 1, wherein the apparatus is caused to obtain two or more microphone audio signals by being further caused to at least one of:

receive the two or more microphone audio signals from the two or more microphones; or retrieve the two or more microphone audio signals from memory.

9. The apparatus as claimed in claim 1, wherein the two or more microphone audio signals are captured from at least one of:

directional microphones;

pressure microphones; or pressure gradient microphones.

10. A method comprising:

obtaining two or more microphone audio signals;

analysing the two or more microphone audio signals for a defined noise type; and processing the two or more microphone audio signals based on the analysing to generate at least one audio signal suitable for automatic speech recognition, wherein analysing the two or more microphone audio signals for the defined noise type comprises:

determining energy estimates for the two or more microphone audio signals;

determining correlation estimates between pairs of the two or more microphone audio signals;

determining a defined noise type estimate based on the energy estimates for the two or more microphone audio signals and the correlation estimates between pairs of the two or more microphone audio signals; and determining a defined noise type frequency threshold below which the defined noise type is a dominant disturbance based on the defined noise type estimate, the energy estimates for the two or more microphone audio signals and the correlation estimates between pairs of the two or more microphone audio signals.

11. The method as claimed in claim 10, wherein processing the two or more microphone audio signals comprises:

selecting, for frequency bands below the defined noise type frequency threshold, a lowest energy microphone audio signal of the two or more microphone audio signals; and selecting, for frequency bands above the defined noise type frequency threshold, a highest energy microphone audio signal of the two or more audio signals.

12. The method as claimed in claim 11, wherein processing the two or more microphone audio signals comprises:

selecting, for frequency bands below the defined noise type frequency threshold, a lowest energy microphone audio signal of the two or more microphone audio signals; and generating, for frequency bands above the defined noise type frequency threshold, a filter-and-sum combination of the two or more microphone audio signals.

13. The method as claimed in claim 12, wherein generating, for frequency bands above the defined noise type frequency threshold, a filter-and-sum combination of the two or more microphone audio signals comprises:

time-aligning the two or more microphone audio signals; and generating a weighted average of the time-aligned two or more microphone audio signals.

14. The method as claimed in claim 12, wherein time-aligning the two or more microphone audio signals comprises:

estimating a direction of sound arrival; and filtering the two or more microphone audio signals based on the direction of sound arrival and a microphone configuration defining the relative locations of microphones configured to capture the two or more microphone audio signals.

15. The method as claimed in claim 14, wherein estimating a direction of sound arrival comprises one of:

estimating a direction of sound arrival based on a cross-correlation analysing of the two or more audio signals;

estimating a direction of sound arrival based on a cross-correlation analysing of the two or more audio signals when an active speech segment is detected; or estimating a direction of sound arrival based on a cross-correlation analysing of the two or more audio signals when an active speech segment is detected and a noise level of the two or more audio signals is lower than a threshold value.

16. The method as claimed in claim 10, wherein the defined noise type comprises at least one of:

structure borne noise;

motor noise;

actuator noise;

wind noise; or handling noise.

17. The method as claimed in claim 10, wherein obtaining two or more microphone audio signals comprises, at least one of:

receiving the two or more microphone audio signals from the two or more microphones; or retrieving the two or more microphone audio signals from memory.

18. The method as claimed in claim 10, wherein the two or more microphone audio signals are captured from at least one directional microphone, and processing the two or more microphone audio signals based on the analysing to generate at least one audio signal suitable for automatic speech recognition comprises: filter-and-summing the two or more microphone audio signals to generate a directional audio signal.

* * * * *

UNITED STATES PATENT AND TRADEMARK OFFICE
CERTIFICATE OF CORRECTION

PATENT NO. : 11,580,966 B2
APPLICATION NO. : 16/912141
DATED : February 14, 2023
INVENTOR(S) : Jorma Mäkinen et al.

Page 1 of 1

It is certified that error appears in the above-identified patent and that said Letters Patent is hereby corrected as shown below:

In the Claims

In Column 20, Line 43, Claim 5, delete "time- align" and insert -- time-align --, therefor.

Signed and Sealed this
Twenty-ninth Day of August, 2023

Katherine Kelly Vidal
*Director of the United States Patent and Trademark Office*